May 29, 1945.  G. A. PETROE  2,377,176
VALVE MECHANISM
Filed May 5, 1944
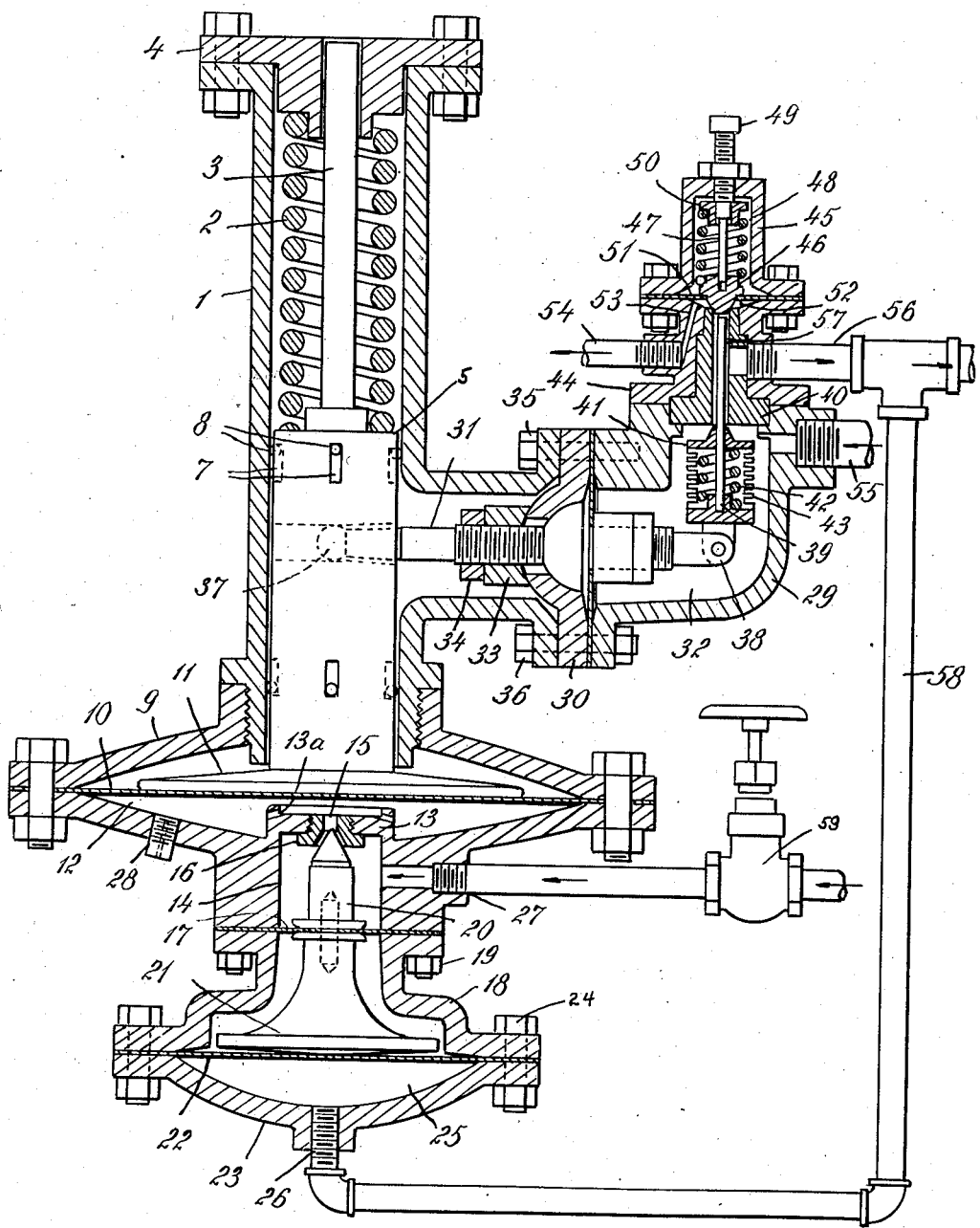
INVENTOR
Gregory A. Petroe
BY
Pennie, Davis, Marvin Edmonds
ATTORNEYS Patented May 29, 1945

2,377,176

UNITED STATES PATENT OFFICE 2,377,176

VALVE MECHANISM

Gregory A. Petroe, Kenmore, N. Y., assignor to The Mathieson Alkali Works, Inc., New York, N. Y., a corporation of Virginia Application May 5, 1944, Serial No. 534,205

3 Claims. (Cl. 137—153)

The present invention relates to a valve mechanism for controlling the flow of fluids and more particularly to an improved unitary flow-control valve mechanism whereby the flow of one fluid is controlled and regulated by the pressure of a second fluid, and whereby the flow of the first fluid is interrupted and the system to which said first fluid is delivered is vented to the atmosphere, or other suitable place of disposition, should the flow of the second fluid fail.

My improved controlled valve is particularly applicable to the regulation and control of the flow of chlorine gas to chlorine dioxide generators or the like and will be specifically described with respect to such use, but it will be understood that its use is not restricted to the handling of chlorine.

For instance, it has been found that chlorine dioxide may be generated by reacting chlorine with a chlorite. Concentrated chlorine dioxide gas is, however, highly explosive and, in order to reduce the hazards of such operation, it is required that the chlorine be supplied to the generator in admixture with a suitable proportion of air or other diluent gas. It is therefore of primary importance that the flow of chlorine be discontinued should any failure of the air supply result. It is also of importance that the rate of chlorine flow to the generator be carefully regulated by control of pressure and volume in accordance with the amount of air supplied and that the supply line leading from the control mechanism to the generator be quickly vented to the atmosphere, or the gas therein be otherwise released from the line, should failure of the air supply occur.

The improved control valve mechanism of my present invention is a unitary control mechanism comprising a plurality of interrelated parts designed to cooperate, as hereinafter described, and adapted to serve each of these required functions.

The invention will be described with reference to the accompanying drawing which represents a cross-sectional view of a particularly desirable arrangement of my improved valve mechanism.

As appears from the drawing, the various moving parts of the valve mechanism are enclosed within and supported by a housing composed of various parts or members suitably held together by conventional means so as to permit convenient assembly and access to the various chambers and parts therein.

Within the housing member 1, the main spring 2 is positioned about the shaft 3, the upper end of the shaft 3 being supported laterally by the flanged bushing 4, which is bolted or otherwise removably fastened to the housing member 1. The shaft 3 is free to move vertically through the bushing 4, which forms the upper seat of spring 2.

The lower end of shaft 3 is enlarged to approximate the inner diameter of the housing member 1 so as to form a lower seat 5 for the spring 2 and to provide lateral support for the lower end of the shaft. As shown, the lower enlarged portion of the shaft 3 is provided with recesses or ball races 7 adapted to receive ball bearings 8 which facilitate the vertical movement of the shaft within the housing.

Threaded on to the lower end of the housing member 1 is the housing member 9 enclosing a chamber of substantially increased cross-sectional area and supporting the flexible diaphragm 10 on which rests the anvil 11 secured to the lower end of the shaft 3. The spring 2 is normally under tension and tends to force the anvil 11 downwardly against the diaphragm 10.

The interior of the housing member 9 is divided by the diaphragm 10 into an upper chamber containing the anvil and a lower chamber 12 hermetically sealed off from the upper chamber by the diaphragm 10. The interior of the housing member 9 is also partitioned by the upwardly protruding valve-seat support 13 to form a lower chamber 14 which communicates with chamber 12 through the opening 15 in the valve-seat 16. The valve-seat support 13 is provided with ducts 13a through which fluid entering through opening 15 may escape into chamber 12 should the diaphragm 10 be forced downwardly onto the valve-seat support 13.

The lower end of chamber 14 is sealed by a flexible diaphragm 17 having its marginal edges secured by the juncture of the lower portion of housing member 9 with a further housing member 18, held together as by nuts shown at 19.

The marginal edges of diaphragm 10 are similarly secured between the flanges of the upper and lower parts of housing member 9 which are held together by conventional means, such as bolts shown in the drawing.

An upwardly projecting valve stem 20 adapted to seat at 16, and a downwardly projecting anvil 21, are supported by the diaphragm 17, anvil 21 resting upon the diaphragm 22 which is in turn supported at its marginal edges by the juncture of housing member 18 and a further housing member 23, these housing members being held together in any suitable manner, as by bolts 24 shown in the drawing, to form a gas-tight chamber 25 beneath the diaphragm 22. Chamber 25 is provided with a pipe connection 26.

Chamber 14 is provided with a pipe connection 27 and chamber 12 is provided with a threaded outlet opening 27 partially closed by a plug 28 having an orifice extending therethrough.

A housing member 29 is supported by a laterally projecting portion of housing member 1, and interposed at the juncture of these two housing members is a member 30 which constitutes a fulcrum for lever 31 and a seal for chamber 32 within the housing member 29. The opening in the fulcrum member 30 through which lever 31 passes may be sealed in any convenient manner which permits operation of the lever. A gas-impervious seal is effected, as shown, by a ball and socket joint in which the curved annular projection of the lever 31 is held against the curved seat of the fulcrum member 30 by the threaded cap 33 and locknut 34. In lieu thereof, or in addition thereto, a gas-impervious flexible metal disc may be sealed onto the shoulder of the lever 31 formed by said annular projection with the marginal portion of said disc clamped between the juncture of fulcrum 31 and housing member 29. The housing member 29 and fulcrum member 31 are firmly but removably held to the lateral projection of housing member 1 by conventional means such as by screw 35 and bolt 36, as shown in the drawing.

At the extreme left, lever 31 connects with shaft 3 by any conventional means, advantageously by a ball joint 37, such as shown in the drawing, and is actuated thereby. At the extreme right, the lever 31 is provided with a coupling 38 for attaching the lever to the lower end of valve stem 39 which extends upwardly through the valve seat 40. Floating on the valve stem 39 there is a valve seating member 41 held upwardly by spring 42. Surrounding spring 42 is a flexible gas-impervious sleeve 43 sealed onto the coupling 38 and the valve seating member 41 at the lower and upper ends, respectively, of the sleeve so as to protect the spring from corrosion and prevent leakage of gas upwardly around the valve stem when the valve seating member 41 is in engagement with valve seat 40.

Surmounting the housing member 29 is a further housing member 44 which surrounds the valve seat 40 and just above housing member 44, is a housing member 45. These housing members are fastened together to form a gas-tight joint, as by means of bolted flanges shown in the drawing.

The valve seat 40 is tightly fitted into the housing member 44, as by shrinking, and extends entirely through said housing member, the upper end of the valve seat 40 forming a further valve seat co-operating with the valve seating member 46.

The valve seating member 46 is held against the upper end of valve seat 40 by spring 48, positioned about shaft 47, the tension of the spring being adjustable by means of the set screw 49 which adjusts the position of the upper spring seat 50. The valve seating member 46 is unseated by the upward vertical movement of the valve stem 39.

The valve seating member 46 is sealed onto a gas-impervious flexible metal flange 51, the marginal portion of which is secured between the flanges at the juncture of the housing members 44 and 45, forming a gas-impervious joint beneath which is a chamber 52.

Chamber 52 is connected by duct 53 with an exhaust pipe connection 54 which leads away from the valve assembly and exhausts into the atmosphere or other suitable place of disposition of chlorine gas or the like.

An inlet pipe connection 55 is provided leading into the chamber 32. An outlet pipe connection 56 is provided leading out from the annular space 57 surrounding the upper portion of the valve stem 39 within the valve seat 40.

When the valve seating member 41 is unseated, gas entering chamber 32 through the inlet connection 55 is permitted to pass upwardly through the annular space 57 and out through connection 56 to the place of consumption. This line 56 is also connected by line 58 to the pipe connection 26 of chamber 25 so that the outlet pressure in line 56 is exerted on the lower side of the diaphragm 22.

Where this valve assembly is used to control the flow of chlorine or other corrosive gases, the parts coming in contact with the chlorine, or the like, should be of corrosion-resistant metal.

The valve assembly will be further illustrated by the following description of its use and operation as applied to the control of chlorine gases to be passed in admixture with air through a chlorine dioxide generator or the like.

As previously noted, it is important in such operations that the pressure under which the chlorine is supplied to the generator be carefully controlled and regulated and that its flow be interrupted immediately and the chlorine exhausted from the line leading to the generator should the air supply fail.

In this valve assembly, valve seating member 41 is firmly held against the valve seat 40, by the downward action of spring 2 on the lever 31, except when sufficient pressure is exerted at the lower side of diaphragm 10 to offset the downward pressure of the spring 2.

In normal operation, diaphragm 10 is held upwardly by the pressure of air entering under pressure from the source of supply through pipe connection 27 into chamber 14 and through the opening 15 in valve seat 16 into the chamber 12. A portion of the air thus entering chamber 12 is permitted to leak out continuously through the orifice in plug 28 so that, in order to maintain the required pressure in chamber 12 to hold the valve seating member 41 away from valve seat 40, air under pressure must be continuously supplied through line 27.

The pressure under which air is supplied to chamber 14 may be regulated by the needle valve 59 in the air supply line. Pressure of about 15 pounds per square inch has been used with advantage but this will depend upon spring tension and the like characteristic of the particular valve assembly.

When in operation, chlorine gas under pressure enters chamber 32, through inlet line 55, passes upwardly through the annular space 57 and out through line 56. Since the outlet line 56 is connected with chamber 25, the outlet pressure of the chlorine gas is exerted against the lower side of diaphragm 22 and tends to force it upwardly against anvil 21 which, in turn, forces the valve stem 20 upwardly toward the valve seat 16, gradually closing the opening 15 and restricting the flow of air into chamber 12 which, due to the resulting drop of the air pressure in chamber 12, permits the shaft 3 to be forced downwardly by spring 2. The downward movement of shaft 3, operating through lever 31, moves the valve seating member 41 toward valve seat 40, thus restricting the flow of chlorine gas through the annular space 57 and resulting in a drop in the outlet pressure of the chlorine in line 56 and, consequently, in chamber 25.

This drop in pressure in chamber 25 permits the valve stem to recede from valve seat 16, thus permitting an increased flow of air into chamber 12. The resultant increase in pressure in chamber 12 tends to force the diaphragm 10 upwardly with the resulting upward motion of shaft 3, which through lever 31, causes the valve seating member 41 to recede from valve seat 40 permitting an increased flow of the chlorine gas through the annular space 57 which tends to increase the outlet pressure of the chlorine gas in line 56 and, accordingly, in chamber 25.

Should the air pressure in chamber 12 fall sufficiently, due to failure of the air supply, shaft 3 will be forced downwardly to an extreme position, at which valve seating member 41 will be forced onto the valve seat 40 so as to close completely the annular space 57, thus interrupting completely the flow of chlorine gas through the valve. Under such extreme conditions, the spring 42 will be sufficiently compressed to permit the valve stem 39 to move upwardly through valve seating member 41 sufficient to unseat valve seating member 46, thus permitting chlorine gas, under pressure in exit lines 56, line 58 and other supply lines leading to the generator, to be exhausted through annular space 57 into chamber 52 and downwardly through duct 53 to the atmosphere through exhaust pipe 54.

The air pressure in chamber 12, which controls the position of the valve seating member 41 and, consequently, the flow of chlorine through the apparatus, is dependent, not alone upon the outlet chlorine pressure exerted in chamber 25, but also upon the air pressure in chamber 14. At a constant air pressure in chamber 14, the position of valve seating member 41 will depend upon the outlet chlorine pressure and, consequently, a substantially constant outlet chlorine gas pressure will be established. However, should the air-supply pressure drop, as distinguished from a complete failure of the air supply, the pressure in chamber 12 will drop proportionately, irrespective of the chlorine pressure in chamber 25 and, as a result, the outlet chlorine pressure will be reduced.

This result is particularly desirable where chlorine and air, to be supplied to a chlorine dioxide generator or the like are passed to a mixing chamber through separate fixed orifices of such respective sizes as to permit the flow of appropriate proportions of the separate gases to the mixing chamber under predetermined pressures.

I claim:

1. A valve mechanism for controlling the flow of fluids comprising a chamber, a fluid inlet to and a fluid outlet from said chamber, a valve interposed in the path of the fluid through said chamber, mechanical means tending to hold said valve in the closed position, whereby the flow of fluid through said chamber is prevented, a second chamber, a diaphragm extending across and forming one wall of said second chamber, a fluid inlet to and a restricted fluid outlet from said second chamber, a second valve interposed in the path of the fluid through said second chamber, said second valve being actuated by a second diaphragm extending across and forming one wall of a third chamber, a fluid connection between said third chamber and the outlet from the first said chamber, whereby the outlet pressure of the fluid is transmitted to said third chamber and is therein exerted against the said second diaphragm, a mechanical connection between the second diaphragm and the said second valve tending to close said second valve when pressure is exerted through the said third chamber against the second diaphragm and a mechanical connection between the first said valve and the first said diaphragm tending to oppose the said mechanical means holding the first said valve in the closed position when fluid pressure is exerted on said first diaphragm through the said second chamber.

2. A valve mechanism for controlling the flow of fluids comprising a chamber, a fluid inlet to and a fluid outlet from said chamber, a valve interposed in the path of the fluid through said chamber, mechanical means tending to hold said valve in the closed position, whereby the flow of fluid through said chamber is prevented, a second chamber, a diaphragm extending across and forming one wall of said second chamber, a fluid inlet to and a restricted fluid outlet from said second chamber, a second valve interposed in the path of the fluid through said second chamber, said second valve being actuated by a second diaphragm extending across and forming one wall of a third chamber, a fluid connection between said third chamber and the outlet from the first said chamber, whereby the outlet pressure of the fluid is transmitted to said third chamber and is therein exerted against the said second diaphragm, a mechanical connection between the second diaphragm and the said second valve tending to close said second valve when pressure is exerted through the said third chamber against the second diaphragm, a mechanical connection between the first said valve and the first said diaphragm tending to oppose the said mechanical means holding the first said valve in the closed position when fluid pressure is exerted on said first diaphragm through the said second chamber, an exhaust port connected with the outlet of the said first chamber, a third valve for controlling the escape of fluid through said exhaust port, said exhaust port valve normally being held in the closed position by mechanical means and mechanical means actuated by the first said mechanical means for opening the said exhaust port valve when the opposing force exerted by the first said diaphragm fails.

3. A unitary valve mechanism for controlling the flow of fluids comprising a housing, a chamber within said housing, a fluid inlet to and a fluid outlet from said chamber, a valve interposed in the path of the fluid through said chamber, mechanical means tending to hold said valve in the closed position, whereby flow of fluid through said chamber is prevented, a second chamber within the housing, one wall of said chamber being formed by a diaphragm extending across a portion of the housing, a fluid inlet to and a restricted fluid outlet from said second chamber, a second valve interposed in the path of the fluid through said second chamber, a third chamber within said housing, one wall of said chamber being formed by a second diaphragm extending across a portion of the housing, a fluid connection between said third chamber and the outlet from the first said chamber, whereby the outlet pressure of the fluid is transmitted to the third said chamber and is therein exerted against the said second diaphragm, a mechanical connection between the second diaphragm and the second valve tending to close said second valve when mechanical pressure is exerted through said third chamber against the said second diaphragm, a mechanical connection between the first said diaphragm and the first said mechanical means tending to oppose the force of said means when fluid pressure is exerted through said second chamber against said first diaphragm, an exhaust port connected with the outlet of the first said chamber, a third valve for controlling the escape of fluid through said exhaust port, said exhaust port valve normally being held in the closed position by mechanical means and mechanical means actuated by the first said mechanical means for opening said exhaust port valve when the force opposing the last said mechanical means fails.

GREGORY A. PETROE.